United States Patent
Visen et al.

(10) Patent No.: US 11,638,150 B1
(45) Date of Patent: Apr. 25, 2023

(54) DYNAMIC MIGRATION OF SESSION DATA BETWEEN FIREWALLS TO FACILITATE LOW-LATENCY SESSION CONTINUITY

(71) Applicant: Sprint Spectrum L.P., Overland Park, KS (US)

(72) Inventors: Anubhav Visen, Overland Park, KS (US); Rajil Malhotra, Olathe, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 147 days.

(21) Appl. No.: 17/249,088

(22) Filed: Feb. 19, 2021

(51) Int. Cl.
*H04W 12/08* (2021.01)
*H04W 12/088* (2021.01)
*H04L 69/326* (2022.01)
*H04L 9/40* (2022.01)
*H04L 67/148* (2022.01)

(52) U.S. Cl.
CPC ....... *H04W 12/088* (2021.01); *H04L 63/0209* (2013.01); *H04L 63/166* (2013.01); *H04L 67/148* (2013.01); *H04L 69/326* (2013.01)

(58) Field of Classification Search
CPC . H04W 12/088; H04L 63/0209; H04L 63/166
See application file for complete search history.

(56) References Cited

U.S. PATENT DOCUMENTS

| | | | | |
|---|---|---|---|---|
| 10,574,670 | B1* | 2/2020 | Verma | H04W 12/72 |
| 2016/0381573 | A1* | 12/2016 | Roeland | H04L 41/0813 |
| | | | | 455/552.1 |
| 2017/0093961 | A1* | 3/2017 | Pacella | H04L 41/5051 |
| 2018/0279186 | A1* | 9/2018 | Park | H04W 36/0077 |
| 2020/0106812 | A1* | 4/2020 | Verma | H04L 63/0227 |
| 2021/0160767 | A1* | 5/2021 | Palamara | H04W 24/02 |
| 2021/0219137 | A1* | 7/2021 | S Bykampadi | H04W 88/16 |
| 2022/0030407 | A1* | 1/2022 | Bercovici | H04W 4/90 |
| 2022/0131830 | A1* | 4/2022 | Dodd-Noble | H04L 61/256 |

* cited by examiner

*Primary Examiner* — Dao Q Ho
(74) *Attorney, Agent, or Firm* — McDonnell Boehnen Hulbert & Berghoff LLP (57) ABSTRACT

A method and system to facilitate session continuity where a user-plane function (UPF) serves user-equipment devices (UEs) and communicates with a transport network by default through a first firewall. As each of various ones of the UEs establishes a respective TCP session via the first firewall, the UPF determines if the UE is likely to engage in latency-sensitive communication, such as if the UE is a Ultra-Reliable Low-Latency Communication (URLLC) device and if so causes the first firewall to record the UE's TCP session 5-tuple to a centralized data storage. Thereafter when the UPF switches to use a second firewall instead of the first firewall (e.g., because the first firewall goes out of service), the UPF causes the second firewall to get from the centralized data store the TCP session 5-tuple of each such UE, for access-control use by the second firewall, to help provide session continuity.

20 Claims, 4 Drawing Sheets

DYNAMIC MIGRATION OF SESSION DATA BETWEEN FIREWALLS TO FACILITATE LOW-LATENCY SESSION CONTINUITY

BACKGROUND

A cellular communication system operated by a wireless service provider typically includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, the system could include a core network having a user-plane subsystem that provides connectivity between the access nodes and various application servers and/or transport networks, and a control-plane subsystem for managing UE and core-network service. With this arrangement, a UE within coverage of the system could engage in air-interface communication with an access node and could thereby communicate via the access node and core network with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. And on the downlink and uplink, the air interface provided by an access node on a given carrier could be configured to define physical resources for carrying information, including control-plane signaling and user-plane traffic, wirelessly between the access node and UEs.

Overview

When a UE first enters into coverage of such a system, the UE could detect coverage of an access node and then engage in random-access signaling and connection signaling with the access node to establish an air-interface connection (e.g., Radio Resource Control (RRC) connection) defining a logical tunnel for carrying communications wirelessly between the UE and the access node. Further, the UE could engage in an attach (i.e., registration) process to register for service with the system and prepare the system to serve the UE.

In an example attach process, the UE could transmit an attach request over the air to the access node, and the access node could forward the attach request to a core-network controller for processing. And after authenticating and authorizing the UE, the controller could then engage in signaling with the access node and with a packet-data-network gateway (PGW) (or other user-plane function), to coordinate setup of data service for the UE. For instance, this signaling could work to coordinate setup of a bearer (data tunnel) that extends between the UE and the PGW and that defines an access point name (APN) connection associated with external transport-network connectivity provided by the PGW. Further, in relation to this process, a Dynamic Host Control Protocol (DHCP) server could assign to the UE an Internet Protocol (IP) address that is homed at the PGW and that the UE could use for IP communication on the transport network.

Once a UE is so connected and attached, the access node could then provide the UE with wireless packet-data communication service. For instance, when the UE has packet data to transmit on the transport network, the UE could send a scheduling request to the access node, the access node could schedule uplink air-interface resources to carry the data from the UE, the UE could accordingly transmit the data over the air to the access node, the access node could forward the data over the UE's bearer to the PGW, and the PGW could output the data onto the transport network. And likewise, when the PGW receives packet data destined to the UE, the PGW could forward the data over the UE's bearer to the access node, the access node could schedule downlink air-interface resources to carry the data to the UE, and the access node could accordingly transmit the data over the air to the UE.

To help ensure security of these and other communications, a representative core network could include a firewall system that is configured to monitor and control the flow of network traffic between the core network and the external transport network.

More particularly, the core network could include a pool of firewalls configured to help control traffic flow between the core network and the transport network. Further, the PGW could have an indication of an IP address of each such firewall and could be set by default to make use of a given one of the firewalls for the PGW's served UEs. Thus, when the PGW receives an IP packet from one of its served UEs for output onto the transport network, the PGW could transmit that packet to the IP address of the PGW's default firewall (or one or more associated routers could be set to so route the outbound traffic from the PGW), and that firewall could in turn output the packet onto the transport network. And when an IP packet arrives from the transport network for transmission to the UE, that default firewall could receive the packet and could forward the packet to the PGW, and the PGW could forward the packet to the UE.

To facilitate control of such traffic flow, the firewall that the PGW is set to use for the PGW's served UEs could maintain records specifying communication sessions that are established for the UE. By way of example, when a UE is going to engage in IP communication with a remote entity, the UE and the remote entity may initially engage in a Transport Control Protocol (TCP) signaling handshake to establish a TCP socket defining a session between the UE and the remote entity, and, upon successful TCP socket establishment, the firewall could create a record of the UE's session, noting the source and destination IP addresses and the source and destination TCP ports, and noting that the transport protocol in use is TCP. The firewall could then use that record as a basis for access control as to IP communication to/from the UE, such as allowing the flow of inbound packets IP packets to the UE only if the IP packets have the same IP addresses and TCP sockets that the firewall has noted for the UE's session.

One technical problem that can arise in such a system is that the firewall so configured to control IP communication to/from a UE may be taken out of service for maintenance or for other reasons, and loss of service of that firewall could result in blocking of IP communications to/from the UE.

In practice, for instance, when such a firewall is taken out of service, the PGW or an associated router may transition to routing UEs' outbound packet traffic to a different firewall selected from the pool of firewalls. Unfortunately, however, that new firewall may not have a record of sessions that were established for those UEs. Therefore, when such a UE sends outbound packet data destined to a remote entity, the new firewall may block outbound transmission of that packet data onto the transport network and/or may block inbound transmission of response packet data to the UE. And as a result, the UE may detect absence of response to the UE's outbound transmissions. After possibly several outbound retransmission attempts, the UE may then conclude that the UE's session is lost. And therefore, the UE may newly work to establish a new TCP socket with the remote entity and so forth as discussed above, to facilitate further communication with the remote entity.

This situation can be especially problematic for UEs that engage in latency sensitive communications, such as UEs that engage in communications related to factory automation, autonomous driving, smart grid control, and telesurgery, or the like. Such communications may require a very high level of reliability and a very low level of latency. And if a UE that engages in such communication loses the UE's session as a result of a firewall outage as discussed above, the consequences could be significant.

The present disclosure provides a mechanism that may help to address this issue.

In accordance with the disclosure, when a PGW serves a UE that engages in a TCP handshake through a first firewall, the PGW will determine whether the UE is a type of device that is likely to be engage in such latency-sensitive communication. And if so, the PGW will notify the first firewall, and the first firewall will responsively write the UE's session data to a centralized data store that is accessible to multiple firewalls. Thereafter, when the first firewall is going to go down for maintenance or for another reason, the PGW could learn of that fact and could responsively transition to routing packet data from the UE to a second firewall instead, and the PGW could signal to the second firewall to cause the second firewall to obtain from the centralized data store a copy of the UE's session data. The second firewall could thus dynamically obtain from the centralized data store the UE's session data, and the second firewall could continue to seamlessly allow the UE's communication in the UE's established session.

In an example implementation of this process, the PGW could maintain a record of which of the PGW's served UEs are likely to engage in Ultra-Reliable Low-Latency Communication (URLLC), e.g., which of the PGW's served UEs is a "URLLC device" (e.g., based on a profile record and/or type of session at issue) When each of the PGW's served UEs establishes a TCP socket through the first firewall, the PGW could thus determine if the UE is an URLLC device and, responsive to determining that the UE is a URLLC device, could notify the first firewall so as to cause the first firewall to write that UE's session data to the centralized data store. Thus, the PGW could notify the first firewall of a set of such UEs based on the PGW determining that each UE of the set is a URLLC device, and the first firewall could write each such UE's session data to the centralized data store. And in turn, when the first firewall is going to go down and the PGW will transition to use the second firewall instead, the PGW could notify the second firewall of each UE of the set, based on each UE being a member of the set, so that the second firewall can then obtain each such UE's session data from the centralized data store to facilitate providing session continuity as noted above.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example network arrangement in which the features of the present disclosure can be implemented. It should be understood, however, that numerous variations from this and other disclosed arrangements and operations could be possible. For instance, various system components and process steps could be added, removed, combined, distributed, re-ordered, or otherwise modified. In addition, it will be understood that operations described herein as being carried out by one or more entities could be carried out in various ways, such as by a processing unit (e.g., one or more microprocessors) programmed with software instructions and/or by various hardware and/or other components.

Figure 1:
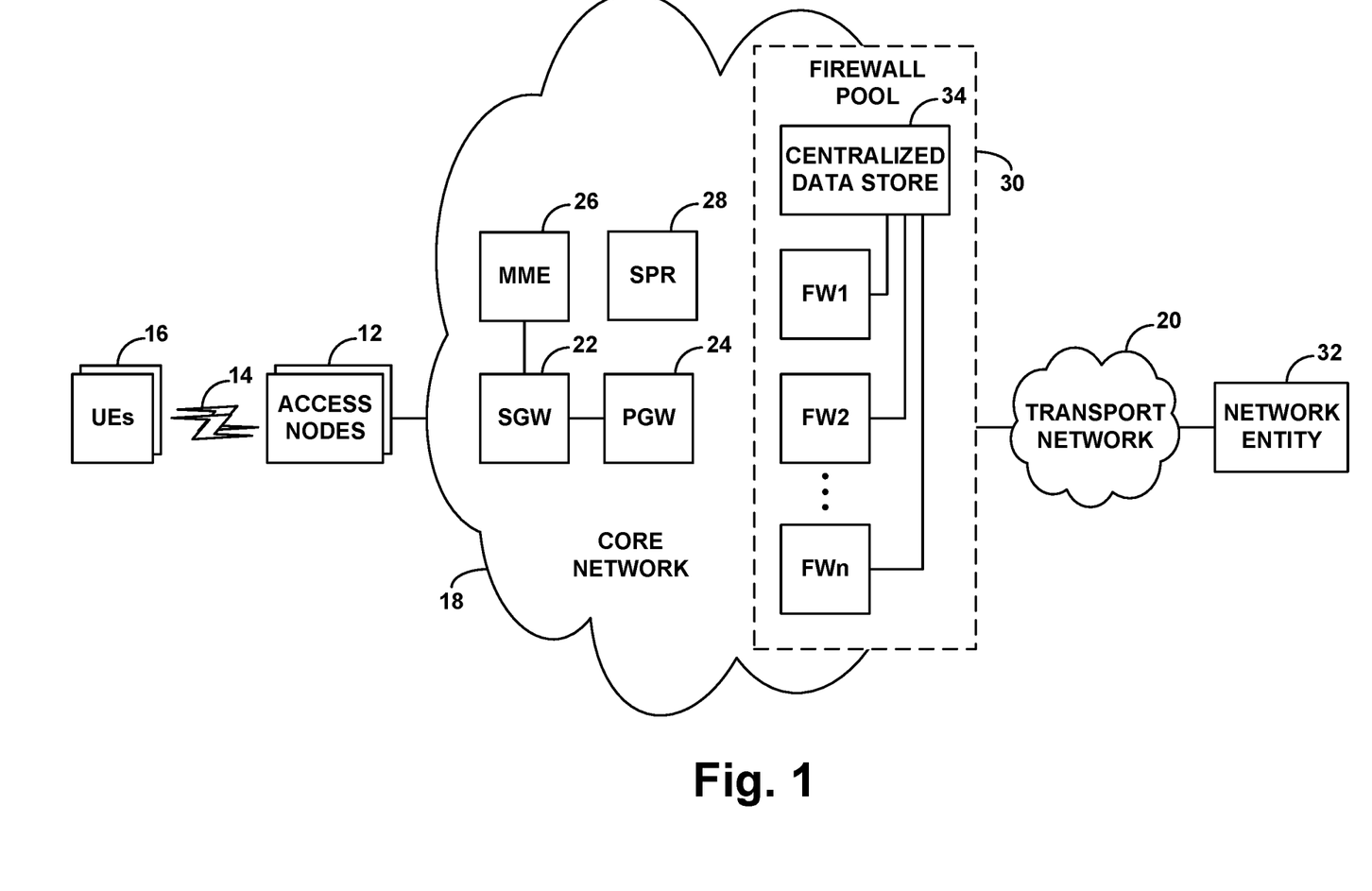
FIG. 1 is a simplified block diagram of an example network arrangement in which features of the present disclosure can be implemented.

As shown in FIG. 1, the example arrangement includes one or more access nodes 12 each configured to provide respective coverage 14 in which to serve UEs 16. And the example arrangement further includes a core network 18 that provides connectivity between the access nodes 12 and an external transport network 20 such as the Internet.

In an example implementation, the access nodes 12 could take various forms, such as macro access nodes of the type configured to provide a wide range of coverage, or small cell access nodes, relays, femtocell access nodes, or the like, possibly configured to provide a smaller range of coverage, among other possibilities. Each access node could thus have a respective antenna structure that is configured to transmit and receive electromagnetic signals in a region defined by an antenna pattern or radiation pattern. And each access node could provide coverage on at least one carrier according to a respective RAT, such as one of those noted above, among other possibilities.

Core network 18 could be a packet-switched network such as an evolved packet core (EPC) network or a next generation core (NGC) network, among other possibilities, on which each access node 12 and various core-network entities could each have an assigned Internet Protocol (IP) address, and through which entities could communicate through virtual packet tunnels or the like. Without limitation, FIG. 1 illustrates the core network 18 as an EPC network.

As shown, the EPC network has a user-plane subsystem including a serving gateway (SGW) 22 and a packet data network gateway (PGW) 24. With this arrangement, each access node 12 could have a communication interface with the SGW 22, the SGW 22 could have a communication interface with the PGW 24, and the PGW 24 could provide connectivity with the external transport network 20. Thus, the user-plane subsystem could provide a path for communication of user-plane data between the access nodes 12 and transport network 20.

Further, the EPC network has a control-plane subsystem including a mobility management entity (MME) 26 as well as control-plane functions (not shown) of the SGW 22 and the PGW 24. The MME 26 could have a communication interface with each access node 12 and with the SGW 22, to facilitate bearer setup and session management, among other functions. And the control-plane functions of the SGW 22 and PGW 24 could facilitate control operations such as assignment of IP addresses to UEs (e.g., with a Dynamic Host Control Protocol (DHCP) server) and signaling related to setup and management of bearers.

And still further, as shown, the EPC includes a subscriber profile registry (SPR) 28, perhaps a lightweight directory assistance protocol (LDAP) server, which could contain UE profile records that indicate per UE the UE device type (e.g., whether or not the UE is a URLLC device) and various associated service subscription data and capabilities data.

In an alternative implementation, with an NGC network, other core-network entities could be provided. For instance, the user-plane subsystem could include a user-plane function (UPF) in place of the user-plane functions of the SGW 22 and PGW 24, and the control-plane subsystem could include an access and mobility function (AMF) in place of certain functions of the MME 26 and a session management function (SMF) in place of other functions of the MME 26 and in place of certain control-plane functions of the SGW 22 and PGW 24. Other arrangements are possible as well.

As shown in FIG. 1, the example network arrangement further includes a pool of firewalls 30, FW1, FW2, . . . FWn. These firewalls are shown at the edge of the core network 18, demarcating the division between the core network 18 and the external transport network 20. As discussed above, each of these firewalls could have a respective IP address on the core network 18, and the PGW 24 could be set by default to engage in external transport-network communication through a given such firewall, say FW1.

In line with the discussion above, when each of various UEs 16 enters into coverage of such a system, the UE could detect threshold strong coverage of a given access node 12, and the UE could then responsively engage in random-access and RRC connection signaling with the access node, to establish an air-interface connection through which the access node 12 could then serve the UE with wireless packet data communications. Further, the UE could engage in attach signaling with the MME 26, via the UE's RRC connection with the access node, to register for service with the core network 18.

As noted above, as part of this attachment process, the MME 26 could coordinate setup for the UE of various bearers defining logical packet tunnels through which the UE could engage in packet-data communications.

For each such bearer, for instance, the MME 26 could engage in signaling with the UE's serving access node 12 and the SGW 22, to coordinate setup of an S1-U packet tunnel between the access node 12 and the SGW 22. Further, the SGW 22 could responsively engage in signaling with the PGW 24 coordinate setup of corresponding S5 packet tunnel, and the access node could responsively engage in signaling with the UE to coordinate setup of a corresponding data radio bearer (DRB) over the UE's air interface connection.

As part of this process, the PGW 24 (e.g., an associated DHCP server) could assign an IP address for use by the UE to engage in packet-data communications, and various entities in the bearer communication path could establish for the UE a context record specifying information about the bearer, such as UE identity, bearer identity, and the like, and specifying certain UE profile data regarding the UE. By way of example, based on data in the SPR 28 for instance, the PGW 24 could establish a context record for each such UE that the PGW 24 serves, noting for each such UE whether the UE is a URLLC device.

Once each such UE is connected with the access node 12 and registered with the core network 18, the UE could then engage in packet-data communication on the transport network 20 as noted above. For example, when the UE has packet data to transmit to an entity on the transport network, the UE's serving access node 12 could assign uplink air-interface resources to carry the packet data, the UE could transmit the packet data over the air to the access node, the access node could forward the data over a bearer of the UE to the PGW 24, and the PGW 24 could output the data onto the transport network 20. And when the PGW 24 receives packet data destined to the UE, the PGW 24 could forward the data over a bearer of the UE to the UE's serving access node 12 and the access node could schedule and provide air-interface transmission of the data to the UE.

FIG. 1 additionally illustrates an example network entity 32 accessible on the transport network 20. This network entity might be an application server by way of example and could be configured to support IP communications with devices, such as with the illustrated UEs 16.

When a UE 16 is going to engage in IP communication with the network entity 32, the UE and network entity might initially engage in a TCP handshake to establish a TCP socket defining a communication session through which the UE and network entity could then engage in further IP communication with each other. The TCP handshake process is typically a 3-way exchange of messages, with the UE first transmitting a TCP SYN message to the network entity, the network entity responding with a TCP SYN-ACK message, and the UE replying with TCP ACK message.

As noted above, when a UE engages in the TCP handshake process, the firewall through which that handshake messaging passes, presumably FW1 by default in the arrangement of FIG. 1, could create a record that indicates the existence of that session. For instance, the firewall could record for the session a 5-tuple specifying (i) IP address of the UE, (ii) IP address of the other party, here network entity 32, (iii) TCP port at the UE, (iv) TCP port at the other party, and (v) the transport protocol in use, here TCP.

Further, as noted above, the firewall can then use this session record to facilitate access control. For instance, if the firewall receives inbound IP traffic destined to the UE's IP address but the inbound IP traffic is from an IP address as to which the firewall does not have an associated 5-tuple for the UE, the firewall could block that traffic.

As indicated above, the firewall that the PGW 24 is using for the PGW's served UEs may be taken out of service for various reasons. This could be for scheduled maintenance or perhaps when the firewall experiences a fault of some sort. When this happens, the PGW 24 and/or an associated router may transition to routing the UEs' outbound traffic to a different firewall selected from the pool 30, such as FW2 for instance. In practice, for instance, the PGW 24 may learn about the first firewall going down, based on Simple Network Management Protocol (SNMP)-based health-messaging or the like. And the PGW 24 could then select FW2 for use moving forward.

As noted above, this switch to a new firewall could create problems, particularly for URLLC devices or the like, as the new firewall FW2 may not have a record of the sessions that were established for UEs served by the PGW 24, and those UEs may therefore experience repeated transmission failures and ultimately a need to newly establish their TCP sessions, which could delay possibly time-sensitive communications.

To help overcome this issue, as noted above, the present disclosure provides for storing in a centralized data store the TCP session information selectively for URLLC devices, and having the new firewall obtain the TCP session data from that centralized data store to help provide session continuity. FIG. 1 depicts an example centralized data store 34, such as a database for instance, in network communication with the firewalls of pool 30.

In line with the discussion above, each time a UE served by the PGW 24 engages in a TCP handshake through FW1, the PGW 24 could detect that fact through deep packet inspection or the like and could then determine from the UE's context record whether the UE is a URLLC device. Responsive to determining that such a UE is a URLLC device, the PGW 24 could then signal to FW1 to notify FW1 of that fact. For instance, the PGW could transmit to the IP address of FW1 an SNMP message that specifies the IP address of the URLLC device (with the message implicitly or explicitly signifying to the FW1 that the UE at that IP address is a URLLC device).

Upon receipt of this message from the PGW 24, FW1 could respond to the fact that the UE at that IP address is a URLLC device by writing the UE's TCP session data to the centralized data store 34, perhaps with an indication that the UE is a URLLC device.

Thereafter, when FW1 is going to go down for maintenance or has another issue (e.g., high CPU cycles or the like) that may cause it to be taken down or non-operative, the PGW 24 could learn of that FW1 health issue through health-check messaging from FW1. And in response, the PGW 24 could then take special action particularly to help ensure session continuity of each URLLC that the PGW 24 serves and that was served by FW1.

Namely, the PGW 24 could select FW2 from the pool 30, to be used instead of FW1 for each such URLLC device specifically. Further, for each such URLLC device, the PGW 24 could establish or cause to be established a routing record that will cause the packet-data traffic from that UE to be routed from the PGW 24 to FW2 rather than FW1. And the PGW 24 could also transmit to FW2 an SNMP message or the like that specifies the IP address of each URLLC device that the PGW 24 serves and that was served by FW1. And transmission of this message to FW2 could cause FW2 to responsively query the centralized data store 32 to obtain the TCP session record for each such UE and could store the obtained TCP session records for use by FW2 to apply access control as noted above.

Through this process, FW2 could thus dynamically obtain from the centralized data store the TCP session data of each URLLC device that was served by FW1 and is now served by FW2. And FW2 may thereby be able to seamlessly continue to serve each such device, possibly avoiding the delay associated with such devices encountering TCP session failure and reestablishment as noted above.

Figure 2:
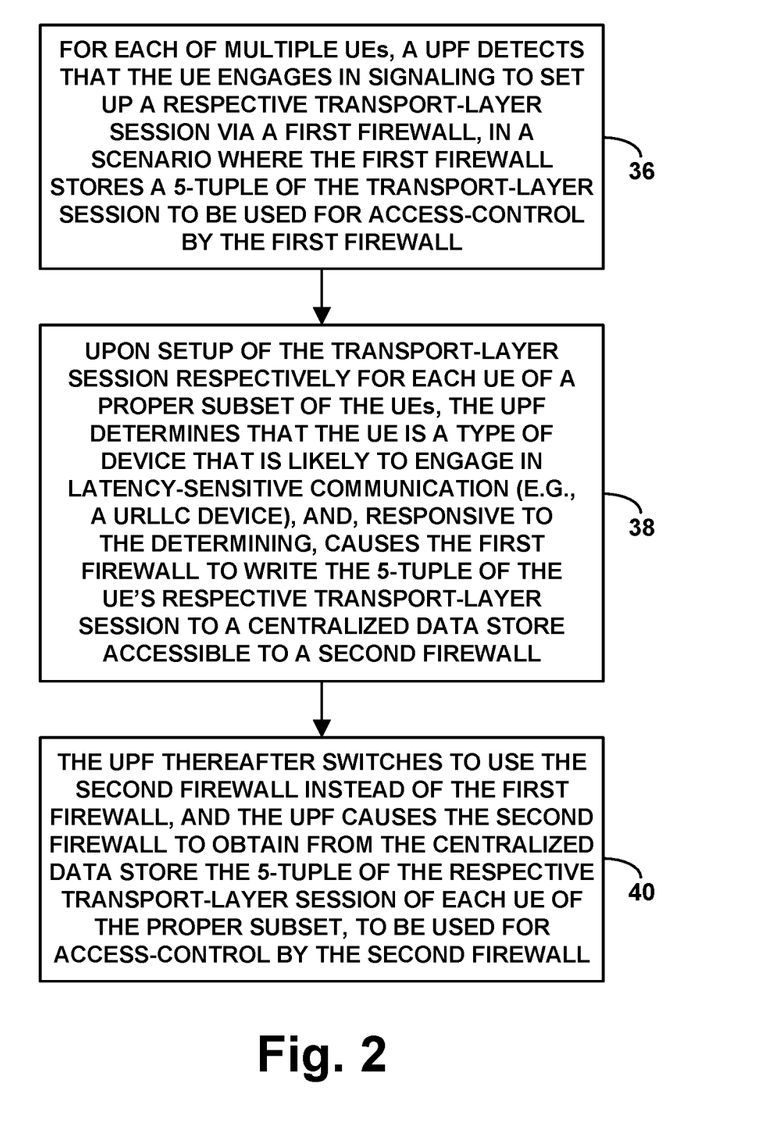
FIG. 2 is a flow chart depicting an example method that could be carried out in accordance with the disclosure.

FIG. 2 is a flow chart depicting an example method that could be carried out in accordance with the present disclosure, to facilitate session continuity for latency-sensitive communications in a communication system in which a UPF serves a plurality of UEs and connects with a transport network through a firewall system including a plurality of firewalls, and in which the UPF is configured by default to communicate with the transport network through a first firewall of the plurality.

As shown in FIG. 2, at block 36, the method includes, for each of the UEs, the UPF detecting that the UE engages in signaling to set up a respective transport-layer session via the first firewall, in a scenario where the first firewall stores a 5-tuple of the transport-layer session to be used for access-control by the first firewall.

Further, at block 38, the method includes, upon (e.g., during, after, or otherwise in association with) setup of the transport-layer session respectively for each UE of a proper subset of the UEs, the UPF determining that the UE is a type of device that is likely to engage in latency-sensitive communication, and, responsive to the determining, the UPF causing the first firewall to write the 5-tuple of the UE's respective transport-layer session to a centralized data store accessible to a second firewall of the plurality.

And at block 40, the method includes the UPF thereafter switching to communicate with the transport network through the second firewall instead of the first firewall, and the UPF causing the second firewall to obtain from the centralized data store the 5-tuple of the respective transport-layer session of each UE of the proper subset, to be used for access-control by the second firewall.

In line with the discussion above, the UPF in this arrangement could take various forms, a non-limiting example of which include a PGW. Further, the transport-layer session could comprise a TCP socket.

Further, as discussed above, the type of device that is likely to engage in latency-sensitive communication could be a URLLC device. And the act of determining that the UE is a type of device that is likely to engage in latency-sensitive communication could involve determining that the UE is a URLLC device, and causing, responsive to the determining, the first firewall to write the 5-tuple could involve causing, in response to the UE being a URLLC device, the first firewall to write the 5-tuple.

As additionally discussed above, the method could include the UPF determining that the first firewall is going to be out of service, in which case the act of switching to communicate with the transport network through the second firewall instead of the first firewall could be responsive to the determining that the first firewall is going to be out of service.

Further, the act of the UPF causing the first firewall to write the 5-tuple of the UE's respective transport-layer session to the centralized data store could involve transmitting from the UPF to the first firewall a message that is interpretable by the first firewall to cause the first firewall to write the 5-tuple of the UE's respective transport-layer session to the centralized data store. And the act of the UPF causing the second firewall to obtain from the centralized data store the 5-tuple of the respective transport-layer session of each UE of the proper subset, to be used for access-control by the second firewall, could involve transmitting from the UPF to the second firewall a message interpretable by the second firewall to cause the second firewall to obtain from the centralized data store the 5-tuple of the respective transport-layer session of each UE of the proper subset. In an example implementation, this latter message could specify a network address respectively of UE of the proper subset.

Still further, as discussed above, the UPF could limit this process to just URLLC devices or just another type of device. For instance, the UPF could limit writing to the centralized data store and obtaining from the centralized data store to be the 5-tuples of just the UEs that the UPF determined to be the type of device that is likely to engage in latency-sensitive communication, and not any UE served by the UPF that is not the type of device that is likely to engage in latency-sensitive communication.

By way of example, if the UPF serves at least one URLLC device and at least one non-URLLC device, and if each such device establishes a TCP session through the first firewall, the UPF could cause the first firewall to write to the centralized data store the 5-tuple respectively of the transport session of each URLLC device but could forego causing the first firewall to write to the centralized data store the 5-tuple respectively of the transport session of each non-URLLC device. Thereafter, when causing the second firewall to retrieve TCP session data from the centralized data store, the UPF could limit that to just the 5-tuple respectively of each URLLC device, such as by giving the second firewall the IP address respectively of just each URLLC device and not any of the non-URLLC devices served by the UPF.

Note also that, if between the time the UPF causes the first firewall to write transport-layer session data to the centralized data store and the time the UPF causes the second firewall to obtain transport-layer session data from the centralized data store, if a UE whose session data was included in that process stops being served by the UPF (e.g., disconnects or otherwise ends its session), the UPF could exclude that UE from the UPF's message triggering the second firewall to obtain transport-layer session data from the centralized data store.

Figure 3:
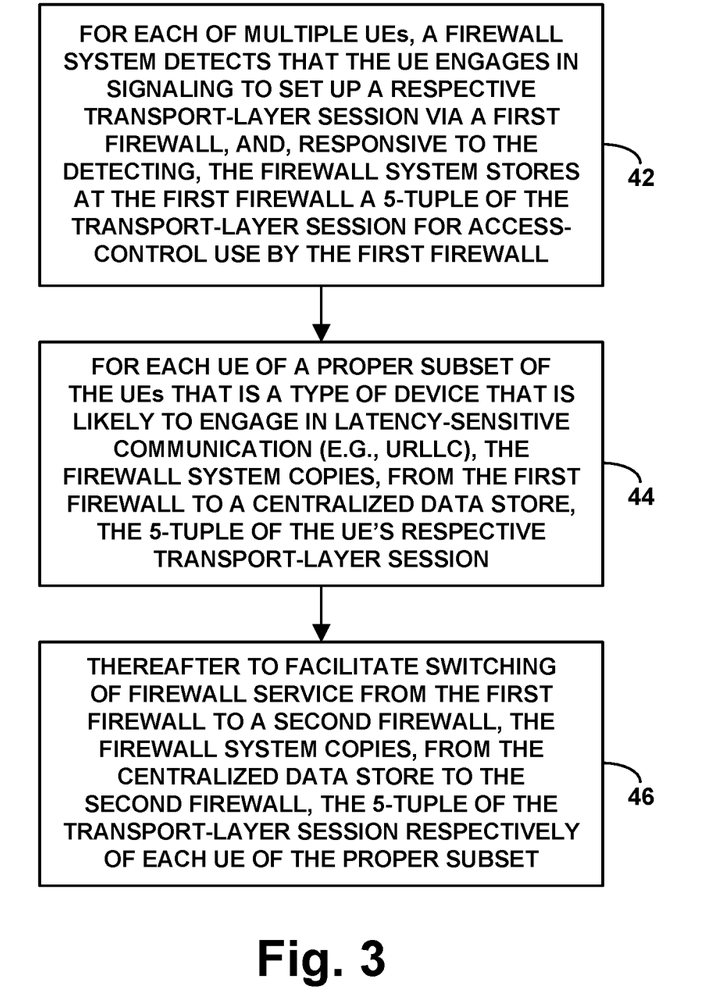
FIG. 3 is another flow chart depicting an example method that could be carried out in accordance with the disclosure.

FIG. 3 is next a flow chart depicting a method that could be carried out in accordance with the present disclosure, to facilitate session continuity for latency-sensitive communications in a communication system in which a UPF serves a plurality of UEs and connects with a transport network through a firewall system including a plurality of firewalls.

As shown in FIG. 3, at block 42, the method includes, for each of the UEs, the firewall system detecting that the UE engages in signaling to set up a respective transport-layer session via a first firewall of the plurality, and, responsive to the detecting, storing at the first firewall a 5-tuple of the transport-layer session for access-control use by the first firewall. Further, at block 44, the method includes, for each UE of a proper subset of the UEs that is a type of device that is likely to engage in latency-sensitive communication, the firewall system copying, from the first firewall to a centralized data store, the 5-tuple of the UE's respective transport-layer session. And at block 46, the method includes, thereafter to facilitate switching of firewall service from the first firewall to a second firewall of the plurality, the firewall system copying, from the centralized data store to the second firewall, the 5-tuple of the transport-layer session respectively of each UE of the proper subset.

In line with the discussion above, here too, the type of device that is likely to engage in latency-sensitive communication could be a URLLC device. And the transport-layer session could comprise a TCP socket.

In addition, as discussed above, the method could include the firewall system receiving from the UPF, respectively for each UE of the proper subset, a message indicating that the UE is the type of device that is likely to engage in latency-sensitive communication, in which case the act of copying, from the first firewall to the centralized data store, the 5-tuple of the UE's respective transport-layer session could be responsive to the message.

Further, the method could additionally include the firewall system receiving a message, e.g., from the UPF, that designates each UE of the proper subset, perhaps at least in part by designating a network address respectively of each UE of the proper subset. And in that case, the act of copying, from the centralized data storage the second firewall, the 5-tuple of the transport-layer session respectively of each UE of the proper subset could be responsive to the message.

Note also that, while these example methods address implementations where transport-layer session records comprise 5-tuples, the same principles could apply as well in a scenario where the transport-layer session records take one or more other forms.

Figure 4:
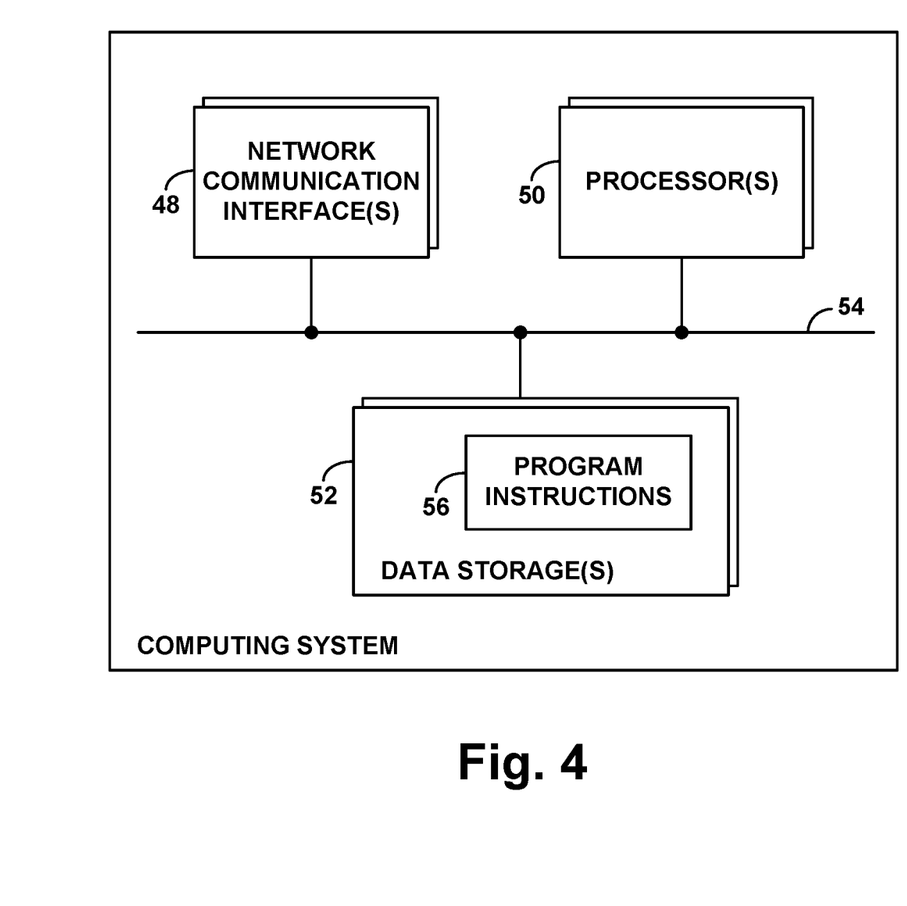
FIG. 4 is a simplified block diagram of an example computing system operable in accordance with the disclosure.

FIG. 4 is next a simplified block diagram of a computing system that could carry out various operations a described herein. This computing system could represent the UPF and/or the firewall system (e.g., particular firewalls), among other possibilities.

As shown in FIG. 4, the example computing system includes at least one network communication interface (e.g., one or more wired and/or wireless communication modules) 48, at least one processor (e.g., one or more microprocessors or specialized processing units) 50, and at least one non-transitory data storage (e.g., one or more volatile and/or non-volatile storage components, such as magnetic, optical, or flash storage) 52, some or all of which could be integrated together or communicatively linked by a system bus or other connection mechanism 54.

As further shown, the at least one non-transitory data storage 52 could store program instructions 56. These program instructions 56 could be executable by the at least one processor 50 to carry out various operations described herein, such as those described above with respect to FIGS. 2 and/or 3, among other possibilities.

The present disclosure also contemplates at least one non-transitory computer readable medium having stored thereon (e.g., being encoded with) program instructions executable by at least one processing unit to carry out various operations described above, e.g., even if separate from the computing system noted above.

Exemplary embodiments have been described above. Those skilled in the art will understand, however, that changes and modifications may be made to these embodiments without departing from the true scope and spirit of the invention.

What is claimed is:

1. A method to facilitate session continuity for latency-sensitive communications in a communication system in which a user-plane function (UPF) serves a plurality of user equipment devices (UEs) and connects with a transport network through a firewall system including a plurality of firewalls, the UPF being configured by default to communicate with the transport network through a first firewall of the plurality, the method comprising:

for each of the UEs, detecting by the UPF that the UE engages in signaling to set up a respective transport-layer session via the first firewall, wherein the first firewall stores a record of the transport-layer session for access-control use by the first firewall;

upon setup of the transport-layer session respectively for each UE of a proper subset of the UEs, determining by the UPF that the UE is a type of device that would engage in latency-sensitive communication, and, responsive to the determining, causing by the UPF the first firewall to write the record of the UE's respective transport-layer session to a centralized data store accessible to a second firewall of the plurality; and thereafter switching by the UPF to communicate with the transport network through the second firewall instead of the first firewall, and causing by the UPF the second firewall to obtain from the centralized data store the record of the respective transport-layer session of each UE of the proper subset, for access-control use by the second firewall.

2. The method of claim 1, wherein the UPF comprises a packet data network gateway (PGW).

3. The method of claim 1, wherein the transport-layer session comprises a Transport Control Protocol socket.

4. The method of claim 1, wherein the type of device that would engage in latency-sensitive communication is an Ultra-Reliable Low-Latency Communication (URLLC) device.

5. The method of claim 1, wherein determining that the UE is a type of device that would engage in latency-sensitive communication comprises determining that the UE is an Ultra-Reliable Low-Latency Communication (URLLC) device, and wherein causing, responsive to the determining, the first firewall to write the record comprises causing, in response to the UE being a URLLC device, the first firewall to write the record.

6. The method of claim 1, further comprising determining by the UPF that the first firewall is going to be out of service, wherein the switching to communicate with the transport network through the second firewall instead of the first firewall is responsive to the determining that the first firewall is going to be out of service.

7. The method of claim 1, wherein causing by the UPF the first firewall to write the record of the UE's respective transport-layer session to the centralized data store comprises transmitting from the UPF to the first firewall a message interpretable by the first firewall to cause the first firewall to write the record of the UE's respective transport-layer session to the centralized data store.

8. The method of claim 1, wherein causing by the UPF the second firewall to obtain from the centralized data store the record of the respective transport-layer session of each UE of the proper subset, for access-control use by the second firewall, comprises transmitting from the UPF to the second firewall a message interpretable by the second firewall to cause the second firewall to obtain from the centralized data store the record of the respective transport-layer session of each UE of the proper subset.

9. The method of claim 8, wherein the message specifies a network address respectively of each UE of the proper subset.

10. The method of claim 1, further comprising limiting by the UPF writing to the centralized data store and the obtaining from the centralized data store to be the records of just the UEs that the UPF determined to be the type of device that is likely to would engage in latency-sensitive communication.

11. A method to facilitate session continuity for latency-sensitive communications in a communication system in which a user-plane function (UPF) serves a plurality of user equipment devices (UEs) and connects with a transport network through a firewall system including a plurality of firewalls, the method comprising:

for each of the UEs, detecting by the firewall system that the UE engages in signaling to set up a respective transport-layer session via a first firewall of the plurality, and, responsive to the detecting, storing at the first firewall a record of the transport-layer session for access-control use by the first firewall;

for each UE of a proper subset of the UEs that is a type of device that would engage in latency-sensitive communication, copying by the firewall system, from the first firewall to a centralized data store, the record of the UE's respective transport-layer session; and thereafter to facilitate switching of firewall service from the first firewall to a second firewall of the plurality, copying by the firewall system, from the centralized data store to the second firewall, the record of the transport-layer session respectively of each UE of the proper subset.

12. The method of claim 11, wherein the type of device that would engage in latency-sensitive communication is an Ultra-Reliable Low-Latency Communication (URLLC) device.

13. The method of claim 11, wherein the transport-layer session comprises a Transport Control Protocol socket.

14. The method of claim 11, further comprising receiving by the firewall system from the UPF, respectively for each UE of the proper subset, a message indicating that the UE is the type of device that would engage in latency-sensitive communication, wherein the copying, from the first firewall to the centralized data store, the record of the UE's respective transport-layer session is responsive to the message.

15. The method of claim 11, further comprising receiving by the firewall system a message designating each UE of the proper subset, wherein copying, from the centralized data storage the second firewall, the record of the transport-layer session respectively of each UE of the proper subset is responsive to the message.

16. The method of claim 15, wherein the message designates each UE of the proper subset at least in part by designating a network address respectively of each UE of the proper subset.

17. A user-plane function (UPF) comprising:

at least one network communication interface;

at least one processor;

at least one non-transitory data storage; and program instructions stored in the at least one non-transitory data storage and executable by the at least one processor to carry out operations for facilitating session continuity in a communication system in which the UPF serves a plurality of user equipment devices (UEs) and connects with a transport network through a firewall system including a plurality of firewalls, the UPF being configured by default to communicate with the transport network through a first firewall of the plurality, the operations including:

for each of the UEs, detecting that the UE engages in signaling to set up a respective transport-layer session via the first firewall, wherein the first firewall stores a record of the transport-layer session for access-control use by the first firewall, upon setup of the transport-layer session respectively for each UE of a proper subset of the UEs, determining that the UE is a type of device that would engage in latency-sensitive communication, and, responsive to the determining, causing the first firewall to write the record of the UE's respective transport-layer session to a centralized data store accessible to a second firewall of the plurality, and thereafter switching the UPF to communicate with the transport network through the second firewall instead of the first firewall, and causing the second firewall to obtain from the centralized data store the record of the respective transport-layer session of each UE of the proper subset, for access-control use by the second firewall.

18. The UPF of claim 17, wherein the UPF comprises a packet data network gateway (PGW).

19. The UPF of claim 17, wherein determining that the UE is a type of device that would engage in latency-sensitive communication comprises determining that the UE is an Ultra-Reliable Low-Latency Communication (URLLC) device, and wherein causing, responsive to the determining, the first firewall to write the record comprises causing, in response to the UE being a URLLC device, the first firewall to write the record.

20. The UPF of claim 17, wherein the transport-layer session comprises a Transport Control Protocol socket.

* * * * *